US011709149B2

(12) United States Patent
Smith et al.

(10) Patent No.: US 11,709,149 B2
(45) Date of Patent: Jul. 25, 2023

(54) COLD TRAP ENHANCED INPUT INTO LOW-COST ANALYZER

(71) Applicant: The Government of the United States of America, as represented by the Secretary of Homeland Security, Washington, DC (US)

(72) Inventors: Barry T. Smith, Egg Harbor City, NJ (US); John Brady, Medford, NJ (US); Jeffrey Barber, Vineland, NJ (US)

(73) Assignee: The Government of the United States of America, as represented by the Secretary of Homeland Security, Washington, DC (US)

(*) Notice: Subject to any disclaimer, the term of this patent is extended or adjusted under 35 U.S.C. 154(b) by 0 days.

(21) Appl. No.: 17/939,676

(22) Filed: Sep. 7, 2022

(65) Prior Publication Data

US 2023/0078593 A1    Mar. 16, 2023

Related U.S. Application Data

(60) Provisional application No. 63/242,743, filed on Sep. 10, 2021.

(51) Int. Cl.
*G01N 27/623* (2021.01)
*H01J 49/00* (2006.01)

(52) U.S. Cl.
CPC ........ *G01N 27/623* (2021.01); *H01J 49/0031* (2013.01)

(58) Field of Classification Search
CPC .... G01N 27/623; G01N 1/405; G01N 1/2205; G01N 1/2214; H01J 49/0031
See application file for complete search history.

(56) References Cited

U.S. PATENT DOCUMENTS

| | | | |
|---|---|---|---|
| 5,954,860 A * | 9/1999 | Gordon | G01N 30/12 95/87 |
| 7,600,439 B1 * | 10/2009 | Patterson | G01N 1/405 73/23.37 |
| 2019/0244798 A1 * | 8/2019 | Makarov | H01J 49/0031 |

* cited by examiner

*Primary Examiner* — David E Smith
*Assistant Examiner* — Hsien C Tsai
(74) *Attorney, Agent, or Firm* — Lavanya Ratnam; Robert W. Busby; Kelly G. Hyndman (57) ABSTRACT

Examples are directed toward systems and methods relating to collecting and analyzing samples. For example, a system includes a cold trap that directly collects a sample. The cold trap operates to serve as a collection filter while the system draws in a flow across the cold trap. A thermal heater, coupled to the cold trap, flash heats the cold trap to produce a released sample from the cold trap at a release concentration. An analyzer entrains the released sample at the release concentration into a sampling flow of the analyzer for analysis.

30 Claims, 5 Drawing Sheets

FIG. 5

COLD TRAP ENHANCED INPUT INTO LOW-COST ANALYZER

CROSS-REFERENCE TO RELATED APPLICATIONS

This application is a nonprovisional application that claims the benefit of priority to U.S. Provisional Application No. 63/242,743 entitled "Cold Finger for Rapid Input of Contraband Vapor Into an Ion Mobility Spectrometer," filed on Sep. 10, 2021, the contents of which are incorporated herein by reference in their entirety.

STATEMENT OF GOVERNMENT INTEREST

The claimed subject matter made by one or more employees of the United States Department of Homeland Security in the performance of official duties. The Government has certain rights in the invention.

FIELD

The present subject matter relates generally to the field of detection, and more specifically to the field of contraband detection.

BACKGROUND

Contraband, such as explosives, propellants, illicit drugs, and the like, can be detected based on the molecules or suspended particles released into the vapor phase. Although such contraband generates vapor or suspended particles, the number of molecules associated with the contraband may be sufficiently low to cause difficulties in detecting the available vapor or suspended particles. As part of contraband detection, air samplers can be used to collect gas phase molecules or suspended particles. Collection filters are placed in the front end of these samplers and are used concentrate available vapor or suspended particles. However, even with the concentration filters, a low mass may be collected and detection of these low quantities typically dictates the use of expensive and high-performance detection equipment. One example of a high performance and expensive detection methodology that could be used for detection of these low quantities are mass spectrometry (MS) techniques, such as but not limited to gas chromatography (GC-MS). However, such equipment is often unavailable due to budgetary or other constraints.

SUMMARY

Example embodiments of a system include a cold trap that directly collects a sample. The cold trap operates to serve as a collection filter while the system draws in a flow across the cold trap. A thermal heater, coupled to the cold trap, flash heats the cold trap to produce a released sample from the cold trap at a release concentration. An analyzer entrains the released sample at the release concentration into a sampling flow of the analyzer for analysis.

In an embodiment, a system includes a thermal desorber to heat a filter to release a sample collected by the filter. A valve controllably releases the sample from the desorber into a sampling flow. A cold trap directly collects the sample from the sampling flow. A thermal heater, coupled to the cold trap, flash heats the cold trap to produce a released sample from the cold trap at a release concentration. An analyzer entrains the released sample at the release concentration from the sampling flow of the analyzer for analysis. A controller directs operation of the thermal desorber, the valve, the cold trap, the thermal heater, and the analyzer.

In another example embodiment, a method includes operating a cold trap to directly obtain a sample. The cold trap is flash heated to release the sample at a release concentration. The sample, released from the cold trap at the release concentration, is entrained into a sampling flow of an analyzer.

In yet another example embodiment, a method includes collecting a sample on a filter of a high-volume air sampler. The filter is heated using a thermal desorber, to controllably release, into a sampling flow, the sample collected by the filter. The sample is collected from the sampling flow by operating a cold trap. The cold trap is flash heated to produce a released sample at a release concentration. The sample, released from the cold trap at the release concentration, is entrained into the sampling flow of an analyzer.

Other features and aspects will become apparent from the following detailed description, which taken in conjunction with the accompanying drawings illustrate, by way of example, the features in accordance with embodiments of the claimed subject matter. This summary is not intended to identify key or essential features of the claimed subject matter, nor is it intended to limit the scope of the claimed subject matter, which is defined solely by the claims attached hereto.

BRIEF DESCRIPTION OF THE DRAWINGS

One or more example embodiments of the subject matter are described in detail with reference to the following drawings. These drawings are provided to facilitate understanding of the present subject matter and should not be read as limiting the breadth, scope, or applicability thereof. For purposes of clarity and ease of illustration, these drawings are not necessarily made to scale.

These drawings are not intended to be exhaustive or to limit the subject matter to the precise form(s) disclosed. It should be understood that the present subject matter can be practiced with modification and alteration, and that the subject matter is limited only by the claims and the equivalents thereof.

DETAILED DESCRIPTION

Embodiments of detection systems described herein can use low cost analyzers and detectors, such as a modified ion mobility spectrometer (IMS) or a low cost MS or the like. The detection systems achieve sufficient concentration and timed release of collected substances for detection. Detection systems described herein relate to improving the detection of contraband (e.g., explosives, propellants, illicit drugs, and the like). Detection systems may sample air or other gases to detect contraband. Embodiments can perform thermal desorption of high-volume sampler filters with cold trap-enhanced input of contraband vapor into, e.g., an ion mobility spectrometer. Such embodiments provide a cost-effective alternative to high-cost approaches (such as but not limited to GC-MS or triple quadrupole MS systems. For example, unlike such high-cost approaches, embodiments can operate using an ion mobility spectrometer (IMS) or relatively inexpensive (e.g., non-quadrupole) mass spectrometer (MS) as the analyzer.

Figure 1:
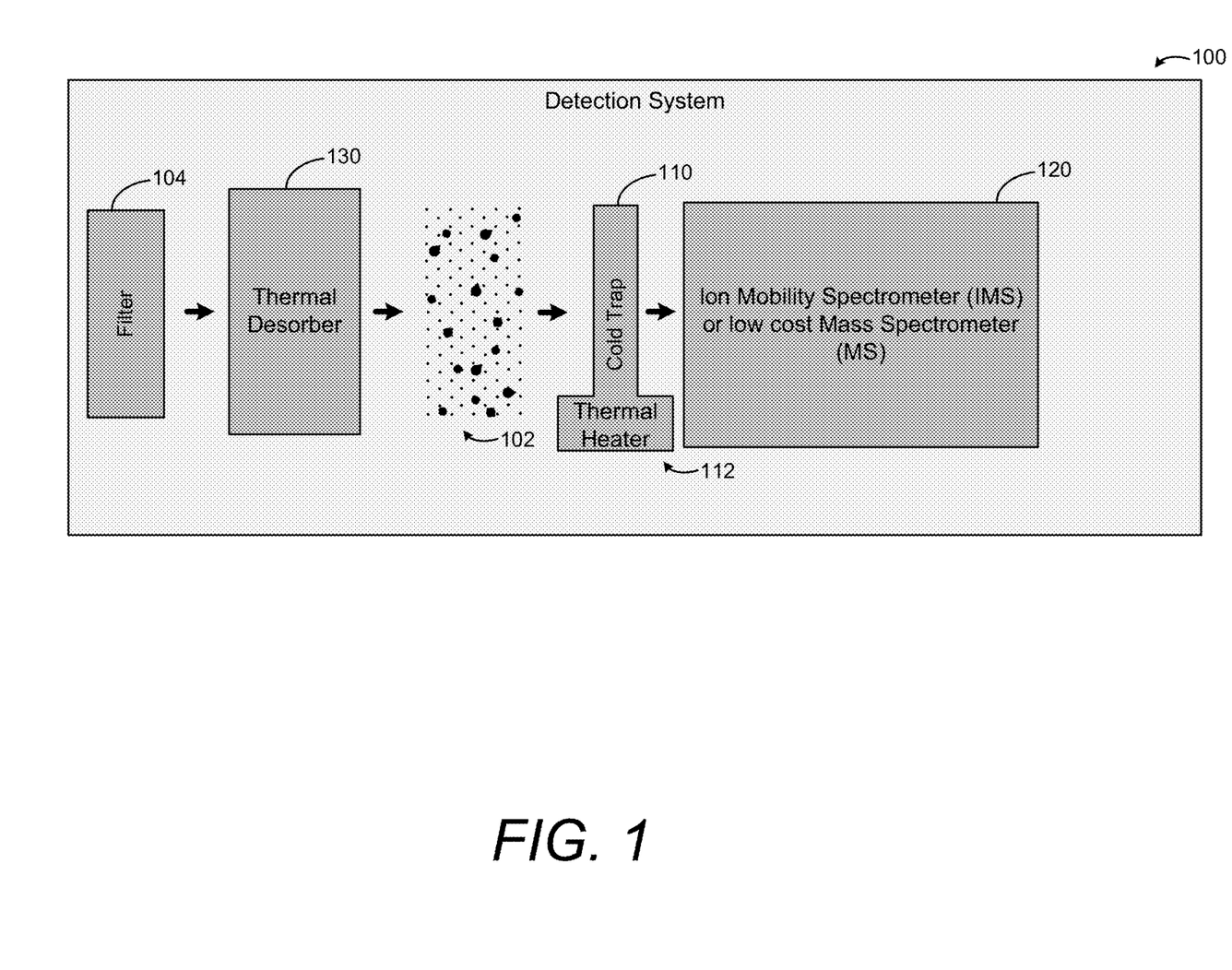
FIG. 1 illustrates a detection system according to an embodiment.

FIG. 1 illustrates a detection system 100 according to an embodiment. Embodiments can provide a detection system 100 that includes a filter 104 (e.g., a high-volume sampler filter), a desorber 130 (e.g., a thermal desorber) to receive the filter 104, a cold trap 110 (e.g., a cold finger) to receive a sample 102 such as gas phase molecules or pyrolysis products freed from the filter 104 by the desorber 130, and a low cost analyzer or detector 120 such as an IMS whose front end is coupled to the cold trap 110. The cold trap 110 can include a thermal heater 112.

When sampling air, a concentrating filter is used as the filter 104 to accumulate sufficient mass of sample on the filter 104. The filter 104 is transferred to the detection system 100 which subsequently releases (via thermal desorber 130) the concentrated sample 102 from the filter 104, for analysis by the analyzer 120 (e.g., an IMS or low cost MS). With careful concentration (via cold trap 110) of the sample 102 into the analyzer 120, detection is possible at a relatively lower system cost compared to more expensive sampling setups (such as those based on GC or triple quadrupole MS). The thermal desorption of the concentrating filter 104 releases the sample 102 from the filter 104, and the detection system 100 captures sample mass onto the cold trap 110 in front of the input to the analyzer 120. A rapid warming of the cold trap 110 (via thermal heater 112) releases the acquired contraband mass of sample 102 directly into the analyzer 120 for analysis and detection.

Vapor concentration involves the collection of vapor or suspended particles that may be available in very low concentrations in the gas phase, such as parts per billion or parts per quadrillion. These low concentrations pose a challenge because some detection methodologies require a higher sample concentration to provide sufficient sensitivity for the identification of the contraband substance. For example, an input to a cold trap might operate with sample concentrations on the order of parts per million or higher, much greater than what may be available. To overcome this issue, sample collection filters can be used to sample a vapor over time; concentrating vapor or suspended particles onto the filter. Different sampling methodologies, techniques, and the like can be used to collect the vapor or suspended particles. Commonly, concentrating filters are used and these filters have a relatively low efficiency when sampling air. The filter is subsequently heated (e.g., via a thermal desorber) causing the concentrating filter to release the collected sample into the system for analysis and detection.

An example scenario using the proposed system involves a detection system 100 arranged to sample air from a box containing a concealed contraband substance such as an explosive. The explosive will release energetic or non-energetic signature molecules or suspended particles into the vapor phase. The sampling detection system 100 is coupled to the box to sample air from the box including the vapor or suspended particles. In an embodiment, the detection system includes a high-volume air sampler coupled to the box via a probe. The air sampler uses a vacuum, hand held sampling device or the like to sample at rates up to 500-600 liters of air per minute from the box for a specified period of time (e.g., a few minutes). A filter 104 used in the air sampler may be chemically modified or have porous polymer resin-based coating that allows for the adsorption of vapor or suspended particles thus concentrating material at some collection efficiency (e.g., 0.1 to 100% depending on filter, packing density, thickness coating, flow rate, and the like). The filter 104 is then taken from the air sampler and placed in a thermal desorber 130 of the detection system 100. The thermal desorber 130 causes the filter 104 to desorb.

In some embodiments, the detection system 100 includes an air sampler that enables operation without needing to manually move the filter 104 from an air sampler to a thermal desorber 130. For example, such detection systems 100 include a filter heater or filter desorber 130 coupled to the filter 104, to heat the filter 104 to cause the filter 104 to produce an output gas including sample 102. In one embodiment, the filter 104 can be constructed using material such as but not limited to silicon nanowires or a nichrome mesh screen that could be rapidly heated via resistive heating to thermally desorb and adsorb material into the detection system 100.

Filters 104 or concentrators are also commercially available and can be used in embodiments of the detection system 100. Example filters 104 can be filled with stainless steel wire, polymers, porous polymer resins, graphite, glass beads, or other suitable materials to serve as sorbents, including a mixture of materials to collect different samples 102 of different boiling points/vapor pressures. The filters 104 and concentrators should be chemically inert and free from any potential background contamination when heated. In another embodiment, the filter 104 can be coated in or contain a substance that can be chemically-treated to enhance its capability to collect and adsorb at least one of desired vapor or suspended particles or to modify the chemistry during the desorption process.

An example method or sequence of using the detection system 100 includes the use of a sampler (e.g., a high-volume sampler) that includes a filter 104 or concentrator to collect gas phase-based samples. The filter 104 or concentrator is taken out of the sampler, and put into the thermal desorber 130. The desorber 130 heats the filter 104 to release any adsorbed mass (e.g., vapor) by heating or ramping the temperature of the filter from 100-600 degrees Fahrenheit (F) or a similar range. This heating process causes the filter 104 to controllably release gas phase molecules or pyrolysis products from the filter 104. The detection system 100, through the use of a slight vacuum or gas flow, entrains the released mass/molecules of the sample 102 from the thermal desorber 130 onto the cold trap 110. The cold trap 110 is set at −25 degrees F. to 40 degrees F. (or a similar range). The detection system 100 arranges the cold trap 110 to a point just in front of an input of the analyzer 120 (an IMS or low cost MS). The cold trap 110 collects the desorbed vapor of the sample 102, and is then subsequently heated to desorb the collected sample from the cold trap 110. The cold trap 110 releases the desorbed collected sample for input into the analyzer 120. The filter 104 and desorber 130 can desorb and produce the sample 102 over a relatively longer desorption time, in contrast to the cold trap 110 which can produce the sample 102 to the analyzer 120 at a concentration having a sharp peak over a relatively longer time, by trapping and quickly desorbing the sample 102.

Figure 2:
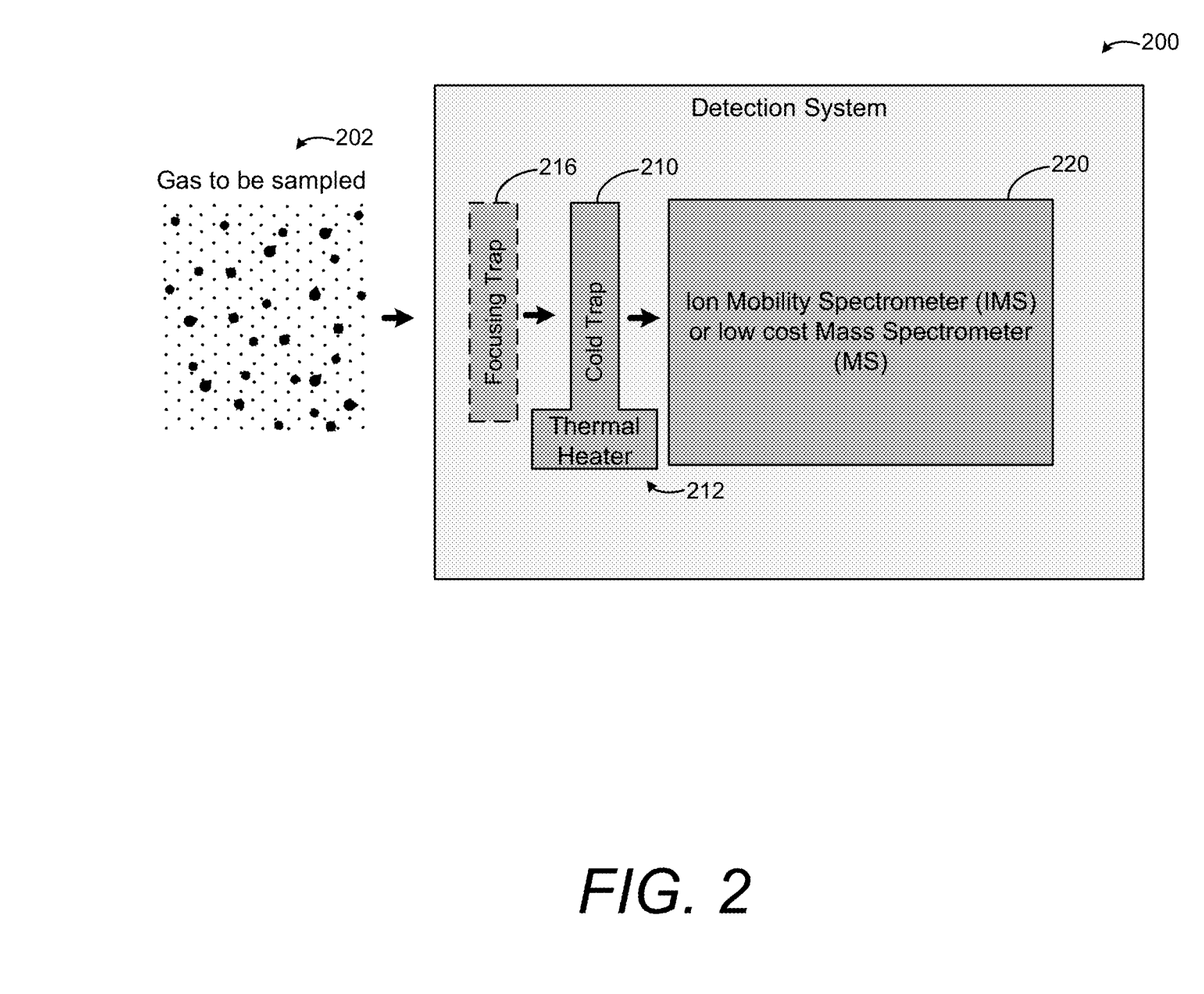
FIG. 2 illustrates a detection system according to an embodiment.

In an embodiment, the method does not involve the filter 104 or the thermal desorber 130. Instead, as shown in FIG. 2, the method can use the cold trap 110 to take a sample 102 directly. The cold trap 110 can then flash warm the cold trap 110 via thermal heater 112, and provide the sample 102 as input to the analyzer 120. The cold trap 110 allows for rapid input of contraband vapor or other sample 102 into the analyzer 120, enabling the use of high volume sampler filters 104 in thermal desorption to produce the sample 102 to be passed on to the cold trap 110. The analyzer 120, even if low-cost or relatively lower sensitivity, is capable of analyzing the sample by virtue of operation of the cold trap 110 or other components, to concentrate the sample to levels compatible with the analyzer 120 (e.g., Ion Mobility Spectrometer (IMS) or low cost Mass Spectrometer (MS)).

FIG. 2 illustrates a detection system 200 according to an embodiment. The detection system 200 receives the sample 202 (gas to be sampled). The detection system 200 includes a cold trap 210 (e.g., a cold finger) and analyzer 220 (also referred to as a detector). The cold trap 210 includes a thermal heater 212. Embodiments of the detection system 200 can include a focusing trap 216.

The detection system 200 can collect samples over a duration on the order of an hour or hours, e.g., by drawing air into the detection system 200 past the cold trap 210. The sample collection time for the cold trap 210 is relatively longer, compared to other embodiments, because the detection system 200 does not use a concentration filter and desorber to pre-concentrate the sample. In contrast, detection system 200 can obtain the sample directly from the environment onto the cold trap 210. The detection system 200 can activate the thermal heater 212 when sufficient sample 202 has been collected. For example, the detection system 200 can use a time period (e.g., 1 hour) to periodically activate the thermal heater 212 to flash heat the sample 202, which then passes from the cold trap 210 to the analyzer 220. In another embodiment, the detection system 200 detects changes in condition of the cold trap 210 (e.g., visually detect the collection of the sample onto the cold trap, or detect a change in weight of the cold trap 210, and so on) and activates the thermal heater 212 when conditions of the cold trap 210 indicate that sufficient sample 202 has been collected.

The illustrated detection system 200 does not include a filter or concentrator component, and does not include a thermal desorber. Without the filter or concentrator, such embodiments do not take advantage of the utility provided by a high-volume sampler, which itself can be operated separately from the detection system 200 to obtain a sample from air located remotely from the detection system 200.

The illustrated detection system 200 can take samples 202 from a specific location, e.g., by drawing air into the detection system 200 over the cold finger 210. Such embodiments enable the detection system 200 to operate the cold trap 210 component as a filter, to take the sample 202 directly. Such embodiments can sample vapor directly, operating as a local air sampler (e.g., to sample the room in which the detection system 200 is located). Such embodiments can adjust a sampling time (e.g., using a controller such as controller 314 shown in FIG. 3) to accommodate the rate of collection of the cold trap 210 to collect enough sample 202, sufficient for detection by the analyzer 220 (e.g., IMS or other low-cost analyzer that typically requires relatively more sample to produce a useful analysis). The cold trap 210 then activates its built-in thermal heater 212 to rapidly desorb or flash heat any adsorbed species of the sample 202 contained in the cold trap 210, from the cold trap 210 into the analyzer 220. For example, a controller of the detection system 200 can set the sampling time of the cold trap 210 on the order of tens of minutes or longer, in contrast to approximately five minutes that a high-volume sampler may use to collect samples 202. The cold trap 210 itself can use different media, to avoid issues with water and other materials. In an embodiment, the cold trap 210 uses chemically inert or passivated components such as stainless steel or other metals having high thermal conductivity and low reactivity. Some embodiments can use focusing traps 216, which can be fluid flow-designed funnels or similar vapor flow apparatuses to entrain gas flows. Embodiments can use different designs of the cold trap 210. Besides designs based on a cold-trap surface (such as a diamond surface), embodiments can use, e.g., a volumetric cold trap 210 with media or material, an external cold trap 210, and so on. Embodiments can position the cold trap 210 at an inlet within proximity of an ionization zone of the detection system 200. The detection system 200 can use a vacuum to entrain or draw in sample released from the cold trap 210.

Figure 3:
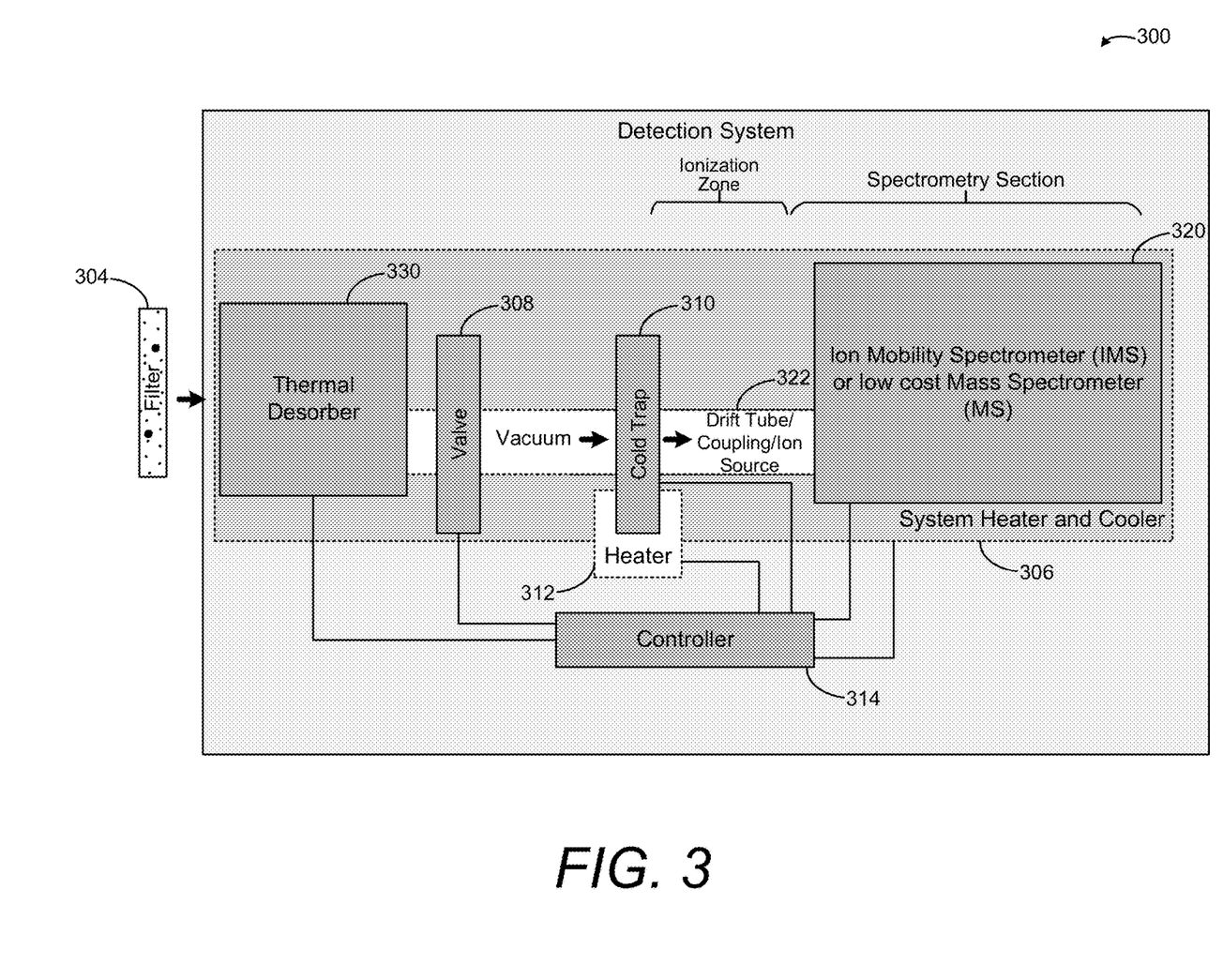
FIG. 3 illustrates a detection system according to an embodiment.

FIG. 3 illustrates a detection system 300 according to an embodiment. The detection system 300 includes an ionization zone and a spectroscopy section. The detection system 300 includes a system heater and cooler 306. The detection system 300 receives filter 304 at desorber 330. Valve 308 selectively controls vacuum along a path from the desorber 330 to cold trap 310. The cold trap 310 includes heater 312. Output from the cold trap 310 passes to the drift tube input 322 of the analyzer 320.

The detection system 300 receives filter 304, e.g., taken from a high-volume sampler. The detection system 300 benefits from the utility provided by a high-volume sampler, which itself can be operated separately from the detection system 300 to obtain a sample from air located remotely from the detection system 300. The high-volume sampler is operated with the filter 304 to load the filter 304 with samples. The filter 304 is then taken from the separate high-volume sampler, and loaded into the detection system 300.

The detection system 300 is illustrated using a vacuum to entrain and "pull" the sample from the desorber 330 to the cold trap 310 and the analyzer 320. In some embodiments, instead of using vacuum (or in addition to a vacuum), the system can use positive pressure and gases or air to entrain and "push" the sample or vapor material from the desorber 330 to the cold trap 310 and to the analyzer 320. In some embodiments, a vacuum is not used.

In the illustrated embodiment, the detection system 300 can include two components to perform thermal desorption. One component (referred to herein as the thermal desorber or desorber 330) performs thermal desorption of the filter 304 (e.g., a high-volume sampling filter which can be used from a high-volume sampler). Another component (referred to herein as thermal heater or heater 312) is coupled to the cold trap 310 to heat the cold trap 310, enabling the cold trap 310 to perform thermal desorption. In this embodiment, the thermal desorber 330 is configured to receive filters 304 (or collectors) from high-volume vapor samplers. The thermal desorber 330 can be a resistive heater, a block or set of blocks that can be heated quickly, a desorber assembly such as a clamp or anvil-based system or the like. The thermal desorber 330 receives the filter 304 and heats the filter 304 in a manner that causes the filter 304 to release a low trickle of sampled molecules. In some embodiments, the detection system 300 applies heat to the filter 304 according to a ramped temperature raise, operating over milliseconds or minutes. In some embodiments, the desorber 330 is provided as a heating element. Because the heating element is coupled to the filter 304, the heating element provides mass to the filter 304. In an embodiment, the detection system 300 uses the heating element to flash heat the filter 304. The desorber 330 can operate with a long desorption time. Such time allows for the sample to be desorbed from the filter 304. The desorbed sample from filter 304 is of sufficient quantity to enable detection by lower-cost analyzers 320, based on operation of other components (e.g., cold trap 310) of the detection system 300. A given material used for the filter 304 or concentrator is chosen as a function of how the filter 304 or concentrator collects and releases samples over time, and under different temperature conditions based on the characteristics of the material in the filter 304 or concentrator. In embodiments, the filter 304 can be based on filtration materials such as cellulose fiber, glass fiber, quartz micro fiber, metals, and the like.

The output from the thermal desorber 330 passes to a cold trap 310 coupled to the output from the desorber 330 (e.g., via valve 308). The cold trap 310 is configured with heater 312 to be heated at a relatively much faster timescale compared to the thermal desorber 330. The detection system 300 flows the output gas produced by the thermal desorber 330, e.g. by using vacuum or positive pressure based on nitrogen or dry air. The detection system 300 flows the output gas to the other components of the detection system 300 including the cold trap 310 and analyzer 320. The detection system 300 can enable the flow based on a vacuum system, positive pressure system, or other component to entrain the sampled material, e.g., using a carrier gas (e.g., nitrogen or dry air), from the desorber 330 onto the cold trap 310 and on to analyzer 320. In an embodiment, the detection system 300 can push or pull the sampled material onto the cold trap 310, and from the cold trap 310 onto the analyzer 320, using a vacuum or flow gas applied through the sample to facilitate the entrainment.

The cold trap 310 then collects the released samples on the cold trap 310 and helps to focus the samples prior to input into the analyzer 320. In an embodiment, the cold trap 310 can be based on a cold finger, cryogenic trap, Peltier cooling, a sterling engine, or the like. The cold trap 310 is capable of lowering the temperature to within the range of −25 to 40 degrees F. or similar. In an embodiment, the cold trap 310 is capable of being set over a range of temperatures from sub-ambient to −150 degrees F. In practice, the temperature of the cold trap 310 should be set to, or colder than, the lowest freezing point for the molecules or materials of interest.

In an embodiment, the cold trap 310 includes its own heating element inside the cold trap 310 to serve as the heater 312. The heater 312 coupled to the cold trap 310 heats the cold trap 310 in a manner to cause the cold trap 310 to flash or rapidly desorb the samples collected by the cold trap 310. The cold trap 310 is heated so that the rapid desorption produces a large spike in gas phase molecules or pyrolysis products being released from the cold trap 310. In some embodiments, the heater 312 coupled to the cold trap 310 heats the cold trap 310 according to a ramp having different hold times at each rising temperature. Such embodiments enable the detection system 300 to detect volatiles at the different hold times. For example, the detection system can distinguish low temperature volatiles from high temperature volatiles. The analyzer then reads the released samples. In an embodiment, the controller 314 directs the heater 312 to follow a heating ramp with multiple hold times over the heating ramp, to release a first volatile product at a first temperature, and to release a second volatile product at a second temperature.

In an embodiment, the cold trap 310 flashes to a temperature above 120 degrees F., such as 600 degrees F. In an embodiment, the cold trap 310 may also contain steel wire, polymers, porous polymer resins, graphite, glass beads, or other suitable materials to serve as sorbents, including a mixture of materials. The composition of the sorbent enables the cold trap 310 to more effectively capture different samples of different boiling points or vapor pressures. Embodiments of the detection system 300 are compatible with cold traps 310 that are commercially available.

The detection system 300 arranges the cold trap 310 at a point just in front of the input to the analyzer 320. In an embodiment, the cold trap 310 is directly connected onto the front-end (e.g., a drift tube input) of an analyzer 320 that is an IMS system. The cold trap 310 can be connected onto an ionization port of the analyzer 320. The cold trap 310 is in proximity to the ionization port of the analyzer 320 so that at least a portion of the flashed sample from the cold trap 310 is entrained into the ionization port of the analyzer 320. Typical distances between the cold trap 310 and the drift tube input 322 can vary from millimeters to inches. A coupling material can be used to couple the cold trap 310 to the analyzer. The coupling material can be passivated, chemically inert or heated to maximize transfer of sample into the analyzer.

Embodiments of the detection system 300 can be implemented by modifying the front end of an analyzer 320 such as an IMS, e.g., by providing a module including a drift tube 322 that serves as input to the analyzer 320. The other components of the detection system 300, such as the cold trap 310 or desorber 330, can be coupled onto the drift tube 322. In an embodiment, the components of the detection system 300 are coupled to the front end of an ionization source (e.g., photo ionization, chemical ionization, plasma discharge or the like) of the analyzer 320 which leads into the drift tube 322 (or drift cell). The embodiments are applicable to analyzers 320 such as IMS devices, and also are applicable to MS systems that are comparably low-cost and have relatively lower specificity and performance compared to high-end triple quadrupole systems used in high-end analysis. Embodiments can be used to detect energetic and non-energetic components of contraband materials.

In an embodiment, the components of the detection system 300 are passivated, chemically inert, or capable of being heated to temperatures up to 600 degrees F. with minimal background. Being capable of being heated allows for analysis of inorganic compounds without further chemical modification. The detection system 300 can use active cooling (e.g., via system heater and cooler 306) to cool the components back to baseline temperatures. Using passivated or chemically inert components allows system operation at temperatures above ambient conditions (e.g., operating at 350 degrees F.). Operating the detection system 300 above ambient conditions prevents adsorption of the sample (e.g., such as a threat material) on the ion optics, transfer tubing, or other components of the detection system 300. Heating the components of the detection system 300 (other than the cold trap 310) during transition points increases transfer of the sample to the cold trap 310 and analyzer 320, thus elevating the quantity of material reaching the analyzer 320, facilitating identification. The heating of other components prevents cold spots in the detection system 300, to discourage the sample from plating components of the detection system 300 other than the cold trap 310. In an embodiment, the detection system 300 uses system heater and cooler 306 to heat components higher than ambient, to prevent adsorption of the sample onto surfaces of those heated components. In another embodiment, the detection system 300 heats other components to temperatures of 180 degrees F. or higher. In addition, should the need arise, the system temperature could be elevated higher (e.g., to roughly 600 degrees F.) to remove any undesired contamination that may be present, cleaning the detection system 300 and removing any undesired background signatures.

In an embodiment, the detection system 300 includes components, such as chemically inert, passivated or heated shutters or valves (e.g., valve 308), to selectively shut off the entrainment flow (also referred to as sampling flow), or provide alternate paths for the entrainment flow. This prevents contamination of the detection system 300 and ensures consistency in the ion chemistry and flows within the drift cells or drift tubes 322, for accurate detection performance. The flow can be maintained at, e.g., 250 mL/min whether or not a sample is present. In an embodiment, the detection system 300 includes a shuttle gate to the cold trap, which flushes into the analyzer 320 (e.g., an IMS). The detection system 300 can use a cryo trap as the cold trap 310. The sample is loaded onto the cryo trap, the flow goes into the analyzer 320 (also referred to as a Gas Chromatograph (GC) or GC-MS or the like). The flow switches over as needed, using sample flow valves 308.

The material released by the cold trap 310 into the analyzer 320 is sufficient for the analyzer 320 to perform a reliable analysis, based on the concentrating effect provided by the detection system 300. This concentrating system effect enables the detection system 300 to use analyzers 320 that are relatively inexpensive compared to equipment used in MS techniques. The detection system 300 reliably detects the vapor or suspended particles due to the concentrating effect provided by the components and arrangement of the detection system 300.

Figure 4:
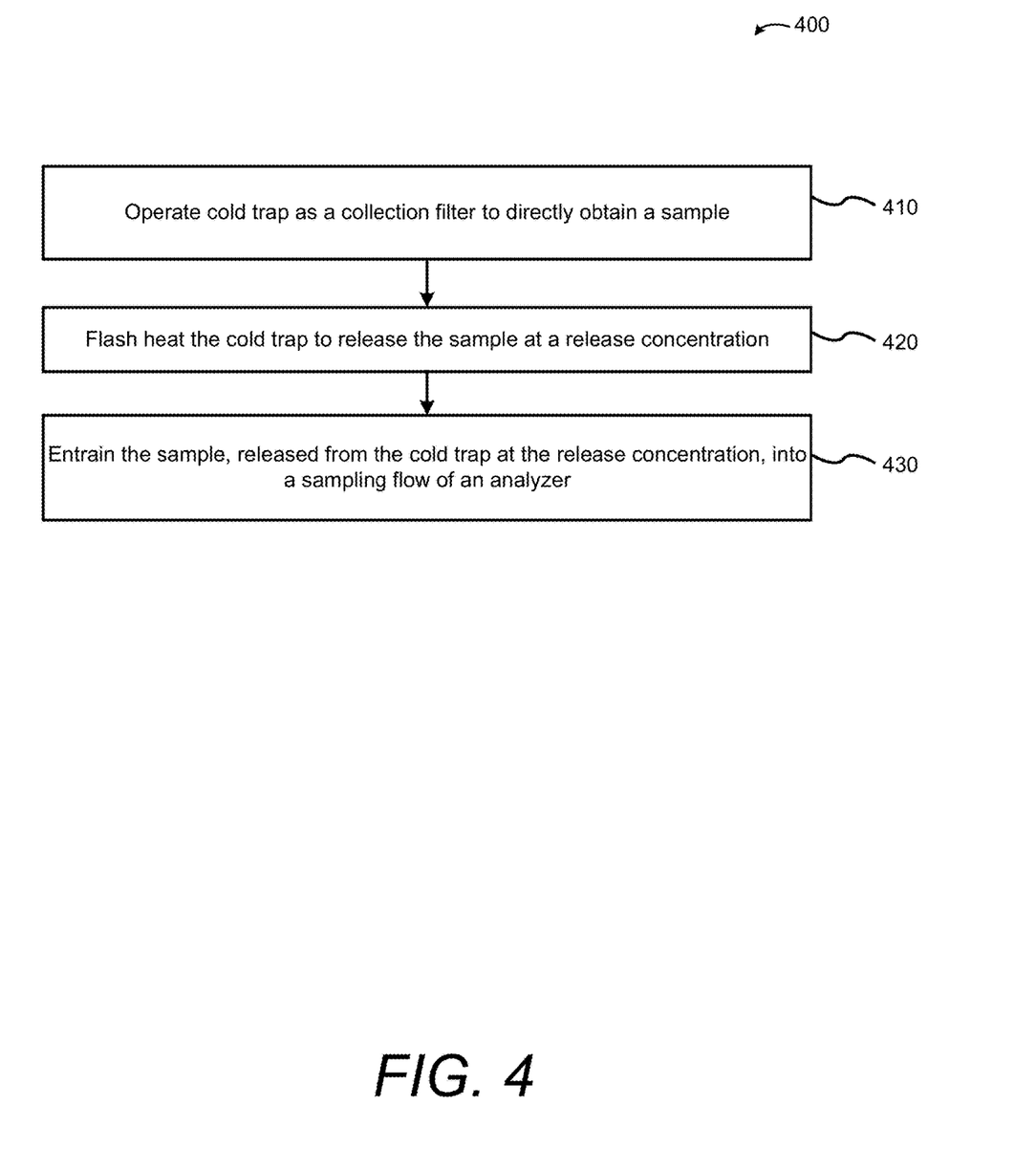
FIG. 4 illustrates a method of entraining a sample according to an embodiment.

FIG. 4 illustrates a method 400 of entraining a sample according to an embodiment. At operation 410, a cold trap is operated as a collection filter to directly obtain a sample. For example, the detection system uses a 1-hour time period to periodically activate the thermal heater, allowing the cold trap to operate and collect the sample for one hour between heatings. In another example, the detection system activates the thermal heater when sufficient sample has been collected, by detecting changes in condition of the cold trap. At flash heating 420, the cold trap is flash heated to release the sample at a release concentration. For example, thermal heater rapidly desorbs or flash heats any adsorbed species of sample contained in the cold trap, causing a concentrated sample to release from the cold trap for entry into the analyzer. At entraining 430, the sample, released from the cold trap at the release concentration, is entrained into a sampling flow of an analyzer. For example, the analyzer receives the sample by using vacuum or positive pressure based on nitrogen or dry air to entrain the released sample and receive the sample into its sampling flow.

Figure 5:
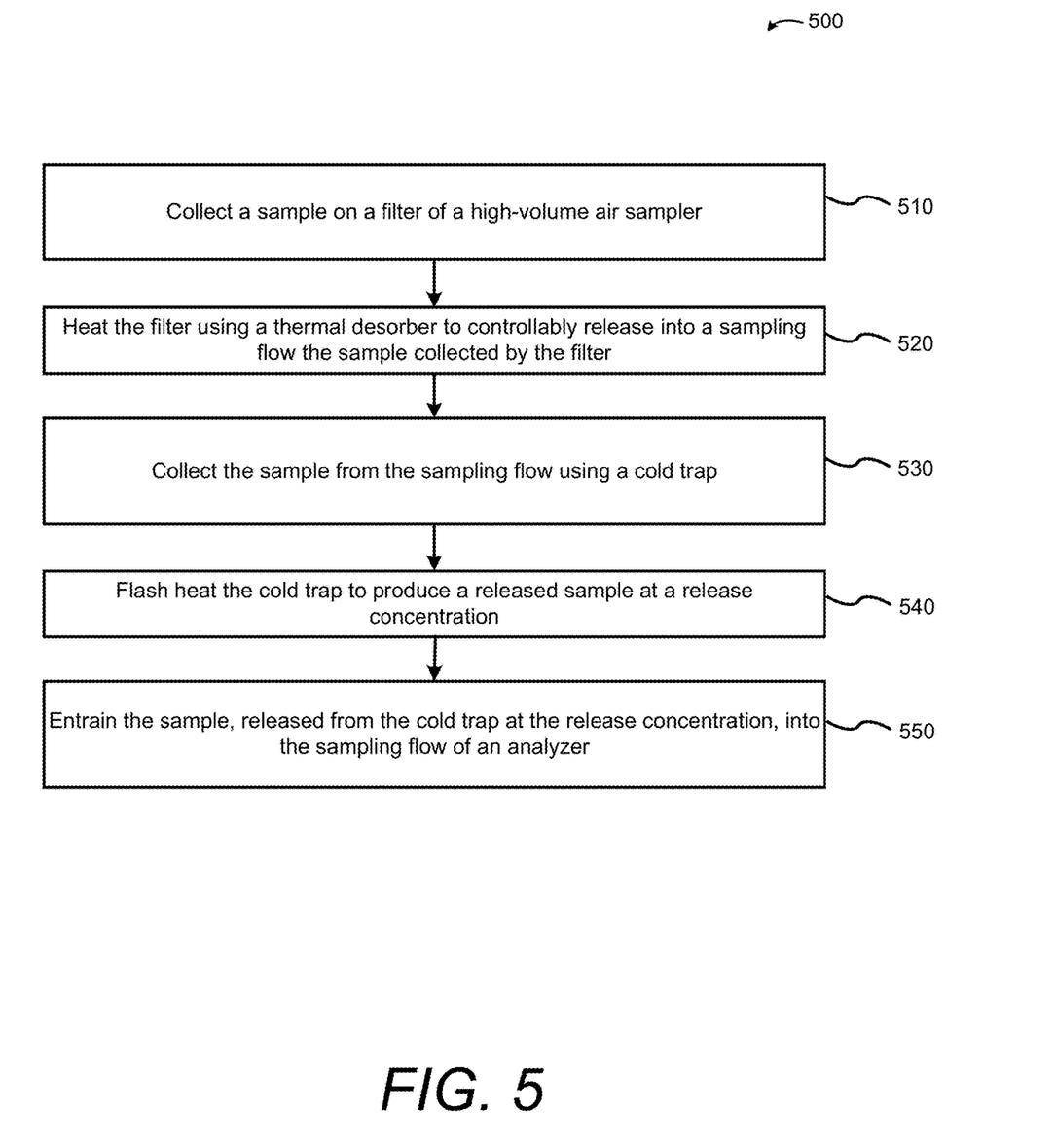
FIG. 5 illustrates a method of entraining a sample according to an embodiment.

FIG. 5 illustrates a method 500 of entraining a sample according to an embodiment. At collection 510, a sample is collected on a filter of a high-volume air sampler. For example, a high-volume air sampler samples air at 500-600 liters per minute for five minutes, to collect the sample onto the filter. At heating 520, the filter is heated using a thermal desorber, to controllably release, into a sampling flow, the sample collected by the filter. For example, the thermal desorber ramps the temperature of the filter from 100-600 degrees Fahrenheit (F) over a desorbing duration of fifteen minutes. At collecting 530, the sample is collected from the sampling flow using a cold trap. For example, the cold trap lowers the temperature to within the range of −25 to 40 degrees F. or similar. In an embodiment, the cold trap is set to, or colder than, the lowest freezing point for the molecules or materials of interest. At flash heating 540, the cold trap is flash heated to produce a released sample at a release concentration. For example, cold trap is heated so that rapid desorption produces a large spike in gas phase molecules or pyrolysis products being released from the cold trap. In some embodiments, the cold trap is heated according to a ramp having different hold times at each rising temperature, the hold times corresponding to different volatile products of interest. At entraining 550, the sample, released from the cold trap at the release concentration, is entrained into the sampling flow of an analyzer. For example, the cold trap is in proximity to the ionization port of the analyzer within millimeters or inches so that at least a portion of the flashed sample flashed from the cold trap is entrained into the analyzer.

While a number of example embodiments of the present subject matter have been described, it should be appreciated that the present subject matter provides many applicable inventive concepts that can be embodied in a wide variety of ways. The example embodiments discussed herein are merely illustrative of ways to make and use the subject matter and are not intended to limit the scope of the claimed subject matter. Rather, as will be appreciated by one of skill in the art, the teachings and disclosures herein can be combined or rearranged with other portions of this disclosure and the knowledge of one of ordinary skill in the art.

Terms and phrases used in this document, unless otherwise expressly stated, should be construed as open ended as opposed to closed—e.g., the term "including" should be read as meaning "including, without limitation" or the like; the term "example" is used to provide example instances of the item in discussion, not an exhaustive or limiting list thereof; the terms "a" or should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Furthermore, the presence of broadening words and phrases such as "one or more," "at least," "but not limited to," or other similar phrases, should not be read to mean that the narrower case is intended or required in instances where such broadening phrases may be absent. Any headers used are for convenience and should not be taken as limiting or restricting. Additionally, where this document refers to technologies that would be apparent or known to one of ordinary skill in the art, such technologies encompass those apparent or known to the skilled artisan now or at any time in the future.

What is claimed is:

1. A system comprising:
   a thermal desorber that receives a high-volume sampler concentrating filter transferred from a vapor sampler and loaded into the system, and heats the high-volume sampler concentrating filter to cause the high-volume sampler concentrating filter to release a sample collected by the high-volume sampler concentrating filter;
   a cold trap that collects the sample while the system draws in a flow from the thermal desorber across the cold trap;
   a thermal heater, coupled to the cold trap, that flash heats the cold trap to produce a released sample from the cold trap at a release concentration; and
   an analyzer that entrains the released sample at the release concentration into a sampling flow of the analyzer for analysis.

2. The system of claim 1, further comprising a focusing trap that entrains the sample onto the cold trap.

3. The system of claim 2, wherein the focusing trap is a fluid flow-designed funnel.

4. The system of claim 1, wherein the cold trap is a volumetric cold trap.

5. The system of claim 1, wherein the cold trap includes a sorbent.

6. The system of claim 5, wherein the sorbent includes at least one of steel wire, polymers, porous polymer resins, graphite, and glass beads.

7. The system of claim 1, wherein the cold trap is coupled to the analyzer via a coupling material.

8. The system of claim 7, wherein the coupling material is heated to facilitate transfer of sample into the analyzer.

9. The system of claim 7, wherein the coupling material is passivated to facilitate transfer of sample into the analyzer.

10. The system of claim 7, wherein the coupling material is chemically inert to facilitate transfer of sample into the analyzer.

11. The system of claim 1, wherein the cold trap is coupled to the analyzer via an ionization source of the analyzer which leads into a drift tube of the analyzer.

12. The system of claim 1, wherein the analyzer is an ion mobility spectrometer (IMS).

13. The system of claim 1, wherein the analyzer is a mass spectrometer (MS) that is not triple quadrupole.

14. A system comprising:
a thermal desorber to heat a high-volume sampler concentrating filter transferred from a vapor sampler to the thermal desorber, the thermal desorber being configured to receive the high-volume sampler concentrating filter loaded into the system, and cause the high-volume sampler concentrating filter to release a sample collected by the high-volume sampler concentrating filter;
a valve to controllably release the sample from the thermal desorber into a sampling flow;
a cold trap that directly collects the sample from the sampling flow;
a thermal heater, coupled to the cold trap, that flash heats the cold trap for a flash time duration to produce a released sample from the cold trap at a release concentration;
an analyzer that entrains the released sample at the release concentration from the sampling flow of the analyzer for analysis; and
a controller that directs operation of the thermal desorber, the valve, the cold trap, the thermal heater, and the analyzer.

15. The system of claim 14, wherein the controller directs the thermal desorber to ramp a temperature of the filter from 100 degrees F. to 600 degrees F.

16. The system of claim 14, wherein the controller sets the cold trap to a temperature of between −25 degrees F. and 40 degrees F.

17. The system of claim 14, wherein the thermal desorber includes a resistive heater.

18. The system of claim 14, wherein the controller adjusts the thermal desorber to apply heat to the filter according to a ramped temperature raise.

19. The system of claim 14, wherein the controller adjusts the thermal desorber to flash heat the filter.

20. The system of claim 14, wherein the controller adjusts the thermal heater to apply heat to the cold trap according to a ramped temperature raise.

21. The system of claim 20, wherein the controller adjusts the thermal heater according to the ramped temperature raise including at least one hold time at a temperature corresponding to at least one volatile compound.

22. The system of claim 14, wherein the valve is a shuttle gate to the cold trap, which flushes into the analyzer.

23. The system of claim 14, further comprising a system heater and cooler, to adjust temperatures of system components including the thermal desorber, the valve, the cold trap, and the analyzer.

24. A method comprising:
loading a high-volume sampler concentrating filter from a vapor sampler into a thermal desorber;
heating, using the thermal desorber, the high-volume sampler concentrating filter to cause the high-volume sampler concentrating filter to release a sample collected by the high-volume sampler concentrating filter;
operating a cold trap for a sample time duration to obtain the sample released from the high-volume sampler concentrating filter;
flash heating the cold trap to release the sample at a release concentration; and
entraining the sample, released from the cold trap at the release concentration, into a sampling flow of an analyzer.

25. The method of claim 24, further comprising adjusting the flash heating of the cold trap according to a ramped temperature raise including at least one hold time at a temperature corresponding to at least one volatile to be sampled.

26. A method comprising:
collecting a sample on a high-volume sampler concentrating filter of a high-volume air sampler;
transferring the high-volume sampler concentrating filter from the high-volume air sampler to a thermal desorber;
heating the filter for a desorbing duration using the thermal desorber, to controllably release, into a sampling flow, the sample collected by the filter;
collecting the sample from the sampling flow by operating a cold trap for a sample time duration;
flash heating the cold trap to produce a released sample at a release concentration; and
entraining the sample, released from the cold trap at the release concentration, into the sampling flow of an analyzer.

27. The method of claim 26, further comprising heating, to temperatures above ambient, detection system components including the thermal desorber, a valve coupling output of the thermal desorber to the cold trap, the analyzer, and a drift tube of the analyzer, to prevent system cold spots and increase transfer of the sample.

28. The method of claim 27, further comprising heating the detection system components to 180 degrees F. or above.

29. The method of claim 27, further comprising heating the detection system components to 600 degrees F. to remove background signatures.

30. The method of claim 26, further comprising maintaining the sampling flow at 250 mL/min.

* * * * *